Jan. 3, 1956 W. C. HODGES ET AL 2,729,352
TRACK ENGAGING APPARATUS FOR MOVING TRANSFERABLE CONTAINERS
Original Filed Oct. 31, 1949 5 Sheets-Sheet 1

INVENTORS
William C. Hodges
Alexander L. Robb
BY Cameron, Kerkam & Sutton
ATTORNEYS Jan. 3, 1956

W. C. HODGES ET AL 2,729,352

TRACK ENGAGING APPARATUS FOR MOVING TRANSFERABLE CONTAINERS

Original Filed Oct. 31, 1949

INVENTORS
William C. Hodges
Alexander L. Robb.
BY Cameron, Kerkam & Sutton
ATTORNEYS

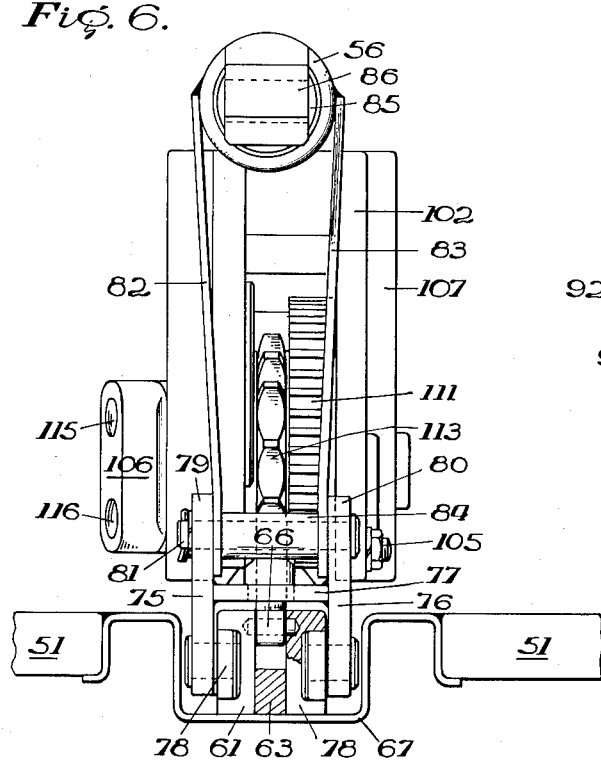
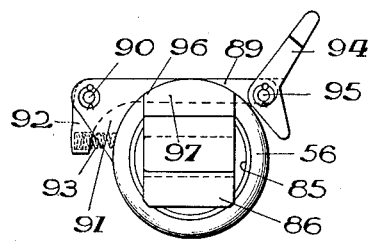
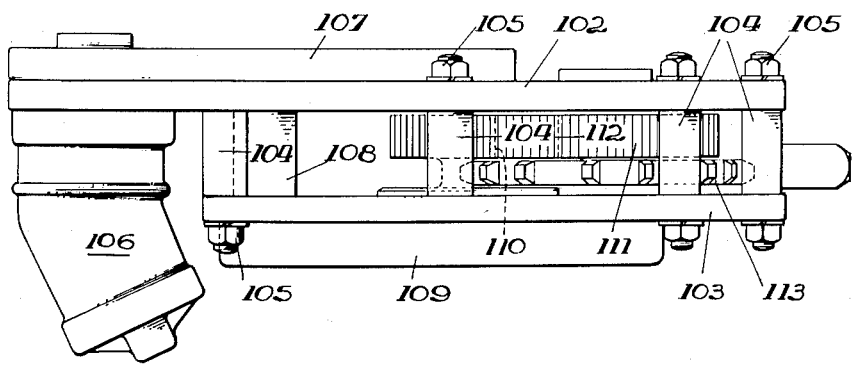

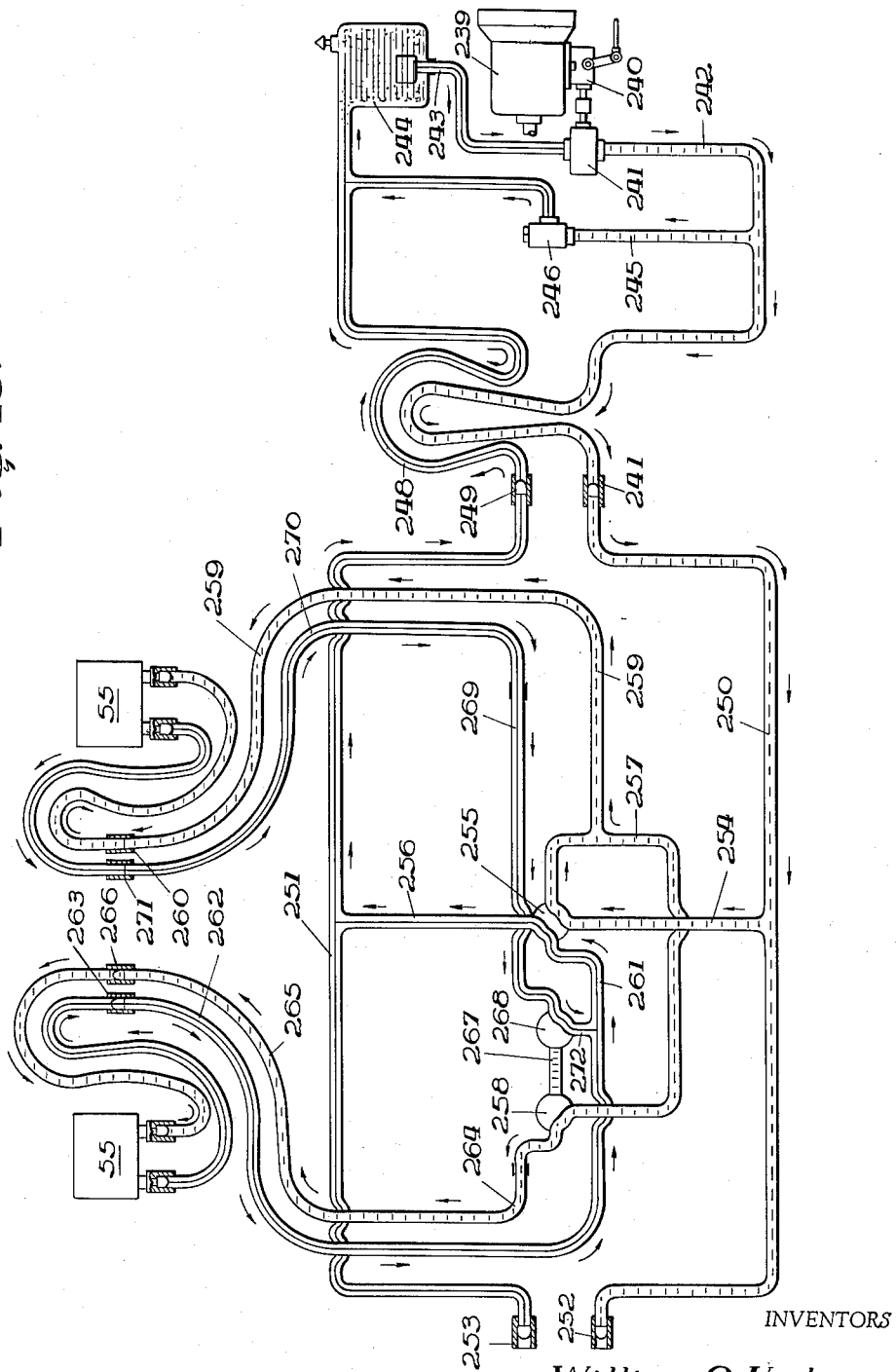

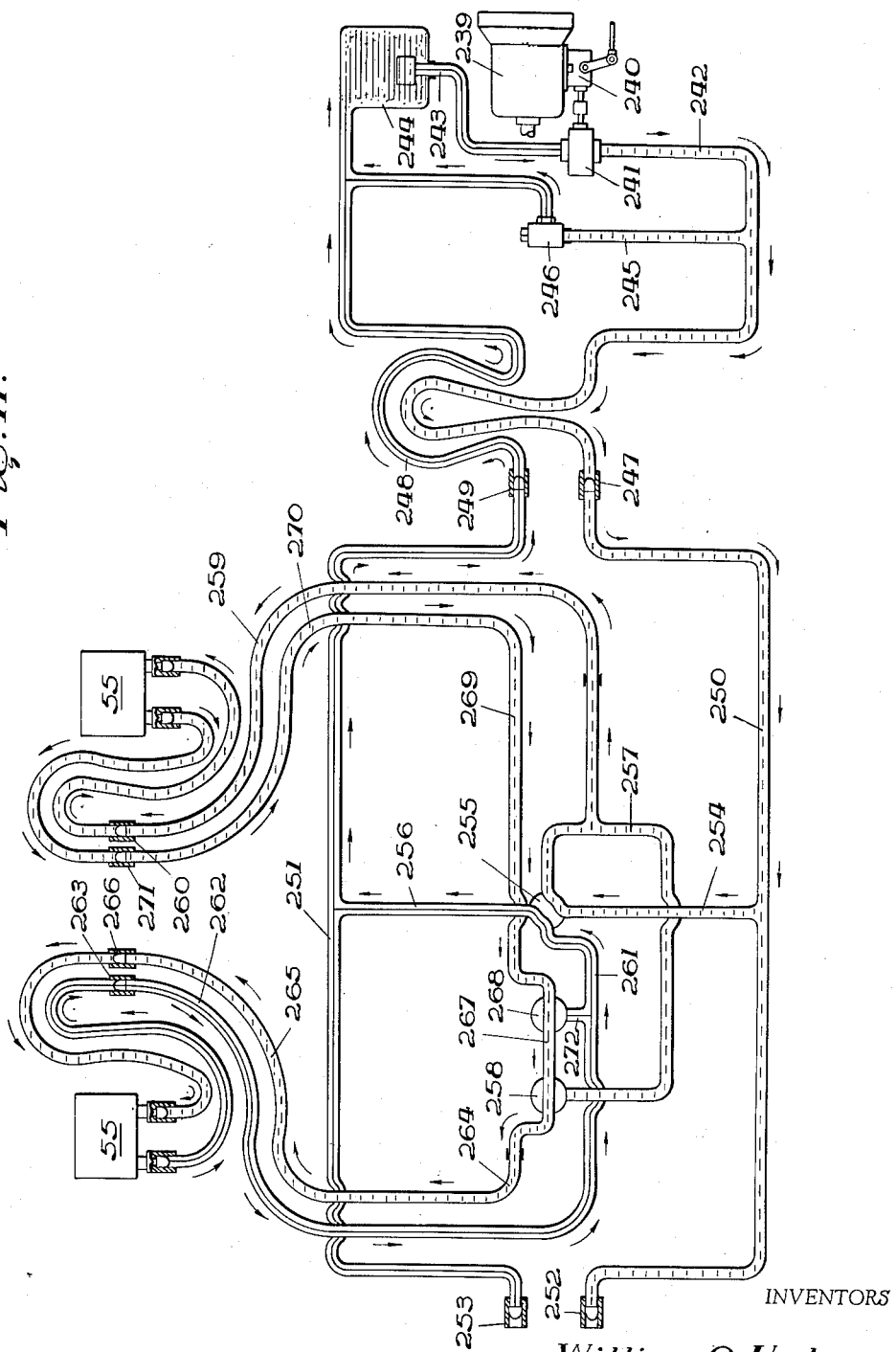

United States Patent Office 2,729,352
Patented Jan. 3, 1956

2,729,352

TRACK ENGAGING APPARATUS FOR MOVING TRANSFERABLE CONTAINERS

William C. Hodges and Alexander L. Robb, Redwood City, Calif., assignors to Hodges Research and Development Company, Redwood City, Calif., a corporation of California Original application October 31, 1949, Serial No. 124,592. Divided and this application August 29, 1951, Serial No. 244,187

8 Claims. (Cl. 214—516)

This invention relates to apparatus for moving transportable containers and more particularly to such apparatus by which less than carload lot sized containers are transferred from and to various types of transporting means or transferred from or to loading docks and the like from or to various types of transporting means.

Heretofore many devices have been proposed for shifting less than carload lot sized containers between various means of transportation or to or from loading docks and the like from or to various transporting means. These known devices are subject to various objections, including unnecessarily complicated and expensive apparatus for effecting the transfer of the containers and for these reasons such apparatus have not been accepted commercially. These known apparatus require such massive and cumbersome machinery for effecting the transfer of the container that the transporting equipment with which such mechanism is associated is thereafter unsuited for any use but the transportation of specially designed less than carload lot containers and these containers can be handled only with such equipment and cannot be utilized as separate mobile units.

By the present invention we have overcome all of the inherent difficulties in these known structures and have further provided novel apparatus for the transfer of less than carload lot containers which is of such a simple yet powerful construction that the apparatus does not in any way preclude the use of the transporting equipment for other purposes than the transportation of the less than carload lot sized containers used with our invention. These containers may be moved and handled by other means than the transfer means herein disclosed and provide separate mobile units for complete transportation of loads from point of origin to point of ultimate disposition.

We have overcome the difficulties inherent in known apparatus by providing the less than carload lot containers with power actuated reciprocal casters at each corner of the container so that the container may be readily raised by extension of the casters into position for rolling on the same or readily lowered from such raised position so that the container will rest on its bottom and the casters may be retracted above the bottom of the container. In conjunction with the casters we have provided power means running on tracks set into the bed of the container transporting means and preferably powered from the engine of the transporting means to move the container upon its casters onto and off of the transporting means. When the container is to be moved from one transporting means to another or from the transporting means to a loading dock or the like we employ bridging elements to bridge the space between the transporting means or the transporting means and the loading dock over differences of elevation thereof to provide a track for the casters and to support the container in transfer. Our apparatus is so constructed and arranged that the several elements thereof are readily transportable and may be used and positioned by the driver of the transporting means without assistance so that it is possible for one man to effect and control the transfer of containers of large size without danger either to the operator or to the container and its contents. By providing the container with castering support at each corner it is possible to readily move the container from one position to another and we provide means for controlling the position of the casters so that the container may be readily towed or pushed into any desired position thus making it possible to effect load transportation from point of origin to point of ultimate disposition without shifting of the load from the container.

It is accordingly an object of the present invention to provide a novel apparatus for effecting the transfer of less than carload lot containers.

Another object is to provide such apparatus in which power means mounted upon tracks in the bed of the transporting means are employed for moving the container onto or off of the transporting means.

Another object is to provide such apparatus in which the power for effecting the transfer of the container is preferably obtained from the driving power of the container transporting means although such power may be obtained from any other suitable source.

Another object is to provide such apparatus which does not require major rebuilding of known types of transporting means for utilization with our less than carload lot containers and which does not preclude the use of the transporting means for other purposes than with our less than carload lot containers.

Another object is to provide such apparatus which is relatively simple and inexpensive to install on existing types of transporting means and which may be used by unskilled personnel with minimum training and experience.

Another object is to provide such apparatus in which novel power means are mounted on tracks in the bed of the transporting means for connection to the container for transferring the same onto and off of the transporting means.

Another object is to provide such novel apparatus with which transfer of the container may be accomplished from either side of the transporting means and in either direction therefrom.

Another object is to provide such novel apparatus which can be readily installed on known types of transporting means without major modification thereof and without so changing the same as to preclude its use for other purposes.

Another object is to provide such novel apparatus which will permit transfer of the container either laterally of the transporting means or longitudinally thereof.

Another object is to provide such apparatus in which transfer of the container is quickly and efficiently accomplished.

Another object is to provide novel connecting means between the powered means and the container which may be extended in length when desired to give additional reach to the powered means.

Other and further objects of the present invention will appear from the following descriptions.

Our invention is capable of various mechanical embodiments, one of which is shown in the accompanying drawings and is described hereinafter for purposes of illustration. It should be understood therefore that this illustrative embodiment of our invention in no way defines or limits the same and reference should be had to the appended claims for this purpose. While hydraulic systems are employed in this illustrative embodiment of our invention and specific mechanical means are also described other than hydraulic systems and modifications of the described mechanical means may be employed within the scope of our invention.

This application is a division of copending application Serial No. 124,592, filed October 31, 1949.

Referring now to the several drawings, in which like reference characters indicate like parts, Fig. 1 is a somewhat schematic representation of a truck equipped with our apparatus for transferring a transportable van or container to a railroad flatcar at higher elevation than the bed of the truck and showing the several elements of the present invention in position for commencing such a transfer;

Fig. 6 is a view of the mechanism of Fig. 4 as seen from the right in Fig. 4;

Fig. 7 is a view from above of a part of the power mechanism of Fig. 4 to illustrate a part of the gear train thereof;

Fig. 8 is an end view with enlarged detail of the hook illustrated in Fig. 4 and with an extension latch also shown therein;

Fig. 10 is a schematic representation of the hydraulic system of the truck connected to the power transfer means for actuating these means in parallel during the transfer of the container; and Fig. 11 is a schematic representation of the hydraulic system of the truck connected to the power transfer means for actuating these means in series during transfer of the container.

Figure 1:
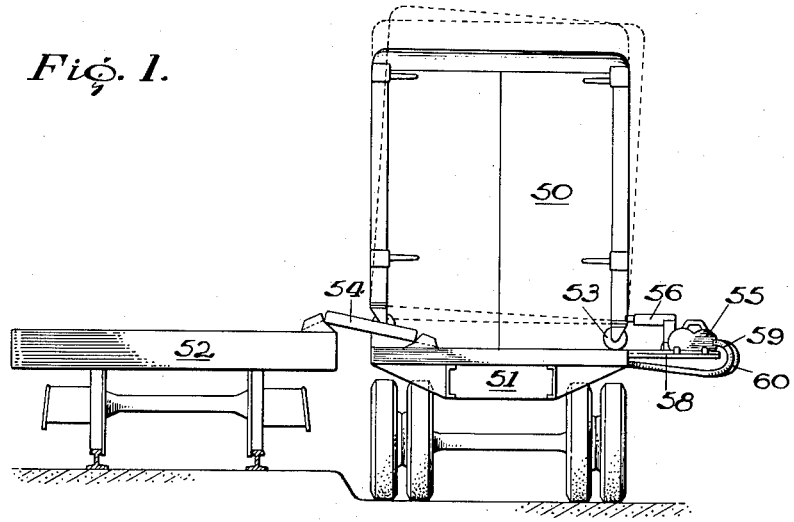
Figure 2:
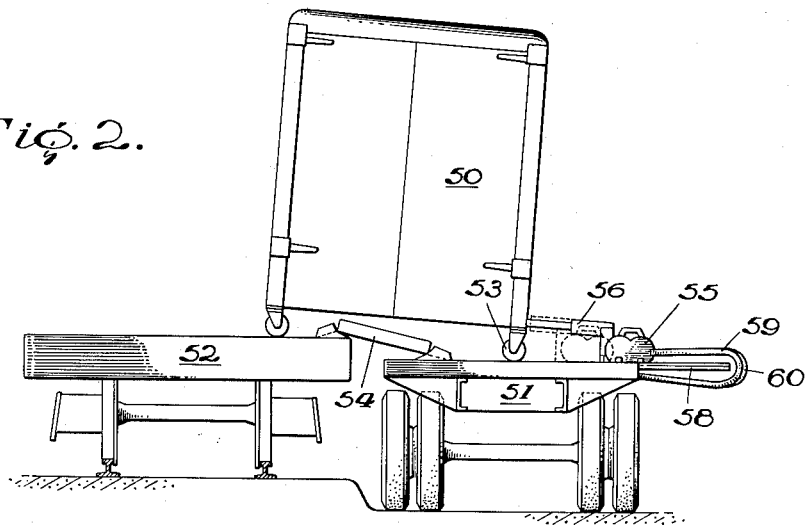
Fig. 2 is another view of the illustrative embodiment of Fig. 1 showing the van partially transferred onto the railroad flatcar and the position of the several elements of the present invention when transfer has been partially completed.

Referring now to the several figures, and more particularly to Figs. 1 and 2, it is there seen that our invention generally comprises, in this illustrative embodiment, apparatus for transferring a transportable container generally indicated at 50, to or from a truck or other suitable transporting means generally indicated at 51, transfer being effected either to or from any other suitable type of transporting means here shown as a conventional railroad flatcar generally indicated at 52. The transferable container 50 is mounted upon castering wheels 53, one at each corner thereof, and these wheels during transfer cross bridging elements 54, bridging the space between the truck and the flatcar. Transferable containers 50 are moved upon casters 53 in transfer by means of one or more power transfer means 55 which are coupled thereto by extensible coupling 56. Power transfer means 55 are mounted upon rails 57 let transversely into the bed of the truck 51 and flush therewith. Rails 57 are provided with extensions 58 for purposes which will more fully appear hereinafter.

As noted above, the system of this illustrative embodiment of our invention for raising and lowering the transferable container 50 and for energizing the power transfer mechanisms 55 is hydraulic and this hydraulic power is applied to power transfer means 55 through hoses generally indicated in these figures at 59 and 60. It should be noted that the several elements of our apparatus such as the bridging rails 54, the power transfer means 55, the rail extension 58 and the other elements to be described hereinafter are so constructed and arranged that they may be readily lifted and placed in position by the driver of the truck without further assistance so that the entire transfer of container 50 may be effected by the driver of the truck without assistance and without employing any other mechanisms and devices than those described in detail herein.

Assume that container 50 is resting upon its bottom on truck 51 and that it is desired to transfer the same from truck 51 to flatcar 52. The driver of truck 51 brings the same into proximity with flatcar 52 and as nearly parallel thereto as practical. It should be understood that it is not essential to the operation of our invention that truck 51 be parallel to flatcar 52 and at the same elevation of flatcar 52 since bridging elements 54 can compensate for differences both in parallelism and in elevation, and power transfer means 55 are powerful enough to overcome differences in elevation above or below the truck level of at least 12 inches with container 50 fully loaded. Having brought the truck 51 into proximity with flatcar 52, the driver then places rail extensions 58 into position on the side of the truck away from flatcar 52 to provide continuation of rails 57 beyond the side of the truck. Power transfer mechanisms 55 are then mounted upon rail extensions 58 and connections 56 are secured to the side of container 50 away from the flatcar 52. The hydraulic system of the present invention is then energized to raise casters 53 above the floor level of the container, as will more fully appear hereinafter, so that bridging rails 54 may be placed in position under the casters adjacent to flatcar 52 to bridge the space between flatcar 52 and truck 51. The hydraulic system is then energized to lower the casters 53 to raise the container off of its bottom and to place the weight thereof upon the several casters 53.

The hydraulic system is then connected to the power transfer mechanisms 55, hoses 59 and 60 being shown for this purpose. Hydraulic power is then supplied to mechanisms 55 and energizes the same and drives them along rail extensions 58, pushing container 50 towards flatcar 52. This movement is continued until the several elements reach the general positions shown in Fig. 2 at which time the hydraulic power supplied to mechanisms 55 may be stopped and the motion of mechanisms 55 reversed to extend coupling 56 when necessary as shown in Fig. 2, as will be described in more detail hereinafter. Coupling 56 is elongated at this time so that container 50 may be transferred completely onto flatcar 52 without the use of rail extensions for rails 57 at the side of the truck adjacent the flatcar. After couplings 56 have been extended, power mechanisms 55 are further energized hydraulically to complete the transfer of the container from the truck to the flatcar in a smooth and continuous movement, the casters riding over bridging elements 54. The use of the elongation of the coupling is necessary only when it is desired to push or pull the van to or from flatcars or platforms or the like farther than is normally required. (In the majority of cases it will not be necessary to use this extensible feature of arm 56).

When container 50 has been positioned upon the flatcar 52, the hydraulic system is suitably adjusted to raise the casters 53 to lower the container upon its bottom on the flatcar. The transfer is now completed and the driver of the truck then disconnects the couplings 56 from the container and reverses the motion of mechanisms 55 to bring them back onto rail extensions 58, whereupon he disconnects hoses 59 and 60 from them, and removes the mechanisms from the rail extensions and places them in any suitable compartment provided on the truck chassis. Rail extensions 58 are removed and bridging elements 54 are also removed and placed in a suitable carrying compartment or rack upon the truck. The truck is then ready to be used for any other purpose or to pick up another transferable container.

When the transfer is to be effected from the flatcar to the trailer, and the transferable container 50 is upon the flatcar 52, the truck 51 is positioned adjacent to flatcar 52 and rail extensions 58 are placed in position. Power mechanisms 55 are then mounted on extensions 58 and hoses 59 and 60 are connected. Hydraulic power is then applied to mechanisms 55 to move them across the bed of trailer 51 with couplings 56 extended if necessary and coupling 56 are secured to the side of the container. The casters 53 of container 50 are raised, if necessary, to allow bridging elements 54 to be put into position to bridge the space between trailer 51 and flatcar 52. Hydraulic power is then applied to the casters 53 of container 50 to raise container 50 off of its bottom so that the weight of the container is supported upon the casters 53. Hydraulic power is then applied to transfer mechanisms 55 to roll container 50 upon its casters 53 off of the flatcar 52 and across the bridging elements 54 onto trailer 51. As soon as container 50 has moved completely onto truck 51, the hydraulic system is actuated to stop transfer mechanisms 55 and then to retract casters 53 so that containers 50 rests upon its bottom on truck 51. The several elements are then disconnected as above described, and placed in suitable containers carried by truck 51 and truck 51 is then ready to drive away with the container, it being obvious, that suitable means may be employed to secure the container 50 to the truck 51, or for that matter, to flatcar 52 and that these ties must be secured or broken as the case may be at the beginning and end of each transfer.

It should be noted that because power transfer mechanisms 55 are mounted upon tracks 57 and are actuated by a hydraulic system, it is impossible for these mechanisms to run away and it is therefore possible to control the movement of the container 50 without danger of the same getting out of control. It should further be noted that the several power transfer mechanisms 55 may be individually controlled so that the direction of motion of container 50 in transfer may also be controlled to the end that the same may be nicely positioned upon either the flatcar or the truck as the case may be.

Figure 3:
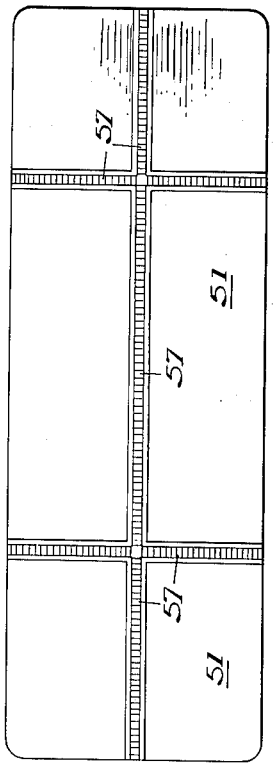
Fig. 3 is a view from above in somewhat schematic arrangement showing the supporting surface of a means of transportation arranged for either transverse or end transfer of our containers.

Fig. 3 shows an arrangement of tracks 57 on truck 51 for effecting end transfer of the container 50 as distinguished from side transfer as above described. In Fig. 3 tracks 57 are let into the truck 51 laterally for side transfer and another track 57 is let into the truck 51 lengthwise thereof. If end transfer is to be accomplished the truck 51 is backed or otherwise suitably positioned so that its rear is adjacent the end of car 52 or any other surface suitable to receive the container 50. Bridging elements 54 are then positioned to bridge the space between truck 51 and car 52 and power units are mounted on the lengthwise track 57 and are connected to the adjacent end of container 50. The transfer of container 50 is then accomplished as described above except that it takes place over the end of truck 51 instead of a side thereof. Obviously more than one longitudinal track 57 may be used and if one such track is available more than one power unit 55 may be mounted thereon and coupled together to obtain the power required to transfer the container.

Figure 4:
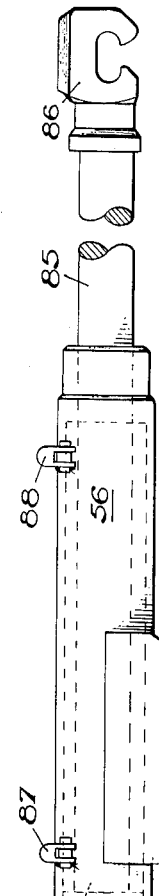
Fig. 4 is a side view of the power mechanism which we employ for transferring the container and showing the transfer mechanism mounted upon its track let into the bed of the truck.
Figure 9:
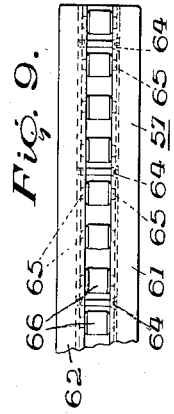
Fig. 9 is an enlarged detail as seen from above of a section of the track upon which the transfer mechanism operates.
Figure 5:
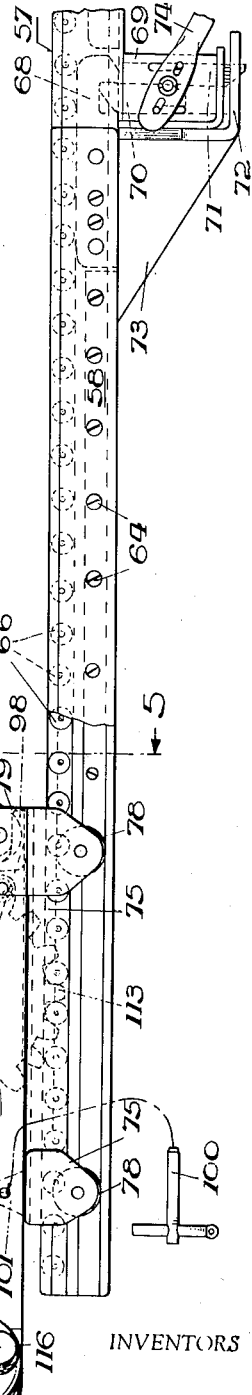
Fig. 5 is a cross-sectional view of the embodiment of Fig. 4 on line 5—5 thereof.

Referring now to Figs. 4, 5 and 6, it is there seen that tracks 57 and track extensions 58 are made up of a pair of U-shaped channel members 61 and 62 spaced by the spacer bar 63 and secured together by a plurality of screws 64 or by any other suitable means passing through the channel members 61 and 62 and through spacer bar 63. The channel members 61 and 62 are so arranged that they are secured in back-to-back relationship with respect to spacer 63. Channel members 61 and 62 are provided with a plurality of spaced, oppositely disposed holes 65 adjacent their upper edges to receive the shafts of rollers 66. Rollers 66 are suitably spaced apart to receive the teeth of the driving sprocket of the power transfer mechanism 55 as will appear in more detail hereinafter. The track made up by channel members 61 and 62, spacer 63 and rollers 66 is secured in the bed of the truck and may be supported by any suitable metallic channel 67.

Rail extensions 58 may be secured to rails 57 by any suitable menas. In Fig. 4 this means includes a hook 68 secured in rail extensions 58 which enters rail 57 where it is engaged by any suitable latching mechanism 69 carried by rail 57. Latching mechanism 69 includes a vertically movable latch 70 to engage hook 68 and a second vertically movable latch 71 to engage L-shaped piece 72 secured to the rail extension 58 by gusset 73. A suitable operating lever 74 may be provided to actuate latches 70 and 71 to lock rail extensions 58 in place. Other means may be employed to lock rail extensions 58 in place.

Referring again to Figs. 4, 5 and 6, a chassis for a power transfer mechanism 55 is there seen to comprise a pair of side plates 75 and 76 suitably connected and spaced by the bed plate 77 to which they are suitably secured as by welding. A plurality of suitable rollers 78 are mounted on the inner side of side plates 75 and 76 for rolling engagement within channel members 61 and 62 so that this chassis is free to roll along tracks 57 and extensions 58. Side plate 75 is provided with an upwardly extending portion 79 and side plate 76 has a similar upstanding portion 80 to receive a cross pin 81. Extensible coupling 56 is pivotally mounted on pin 81 by a pair of gussets 82 and 83 which are secured to coupling 56 by any suitable means as by welding. Gussets 82 and 83 are of reduced dimensions at their extremities away from coupling 56, and are spaced apart by spacer 84, through which pin 81 passes. The pivot thus formed allows coupling 56 to rotate through a limited arc about pin 81 to allow for the differences of elevation taken by container 50 during transfer.

Coupling 56 is preferably formed as a hollow cylinder in which a cylindrical extension or arm 85 is free to reciprocate. Arm 85 terminates in a suitable hook 86 which provides a means for connecting with the container 50 for moving the same, and terminates at its opposite end in a collar 85a which is slidable within tube 56, the container 50 being provided with horizontal pins or other suitable means for engaging hook 86. Extension 85 is secured in a retracted position by latch 87 and is secured in an extended position by latch 88. Latches 87 and 88 are of identical construction except for right and left hand angular cam surfaces and are shown in detail in Fig. 8. As there shown, the latches comprise a cross member 89 pivoted at 90 to an extension 91 suitably secured to one side of coupling 56. Cross member 89 has a downwardly turned ear 92 and a spring 93 is mounted between ear 92 and member 56 to urge cross member 89 into latching position. An L-shaped lever 94 is pivoted on the other end of cross member 89 as at 95 and when rotated in one position prevents cross member 89 from falling into slot 96 cut through the top of coupling 56 and registering with the edge of collar 85a to automatically lock arm 85 and cylinder 56 together. Extension 85 slides freely within coupling 56 so that the same may be extended or retracted and by suitably arranging latches 87 and 88, member 85 will be automatically secured in either extended or retracted position.

Power transfer mechanisms 55 are mounted on the chassis running on tracks 57 by forming the housing of the same with extensions 98 which slip under spacers 84 and by boring the housings transversely as at 99 to receive pins 100 which pins pass through ears 101 correspondingly bored and mounted on top plates 77.

A power transfer mechanism 55 is shown in detail in Figs. 4, 6 and 7 and as there shown comprises a pair of spaced parallel side housings 102 and 103 spaced apart by spacers 104 through which suitable bolts 105 are passed. Any suitable hydraulic motor 106 is secured to housing 102 and the motor shaft of this motor terminates in a drive gear, neither shaft nor gear being shown since the structure is entirely conventional. This small motor drive gear meshes with a large gear mounted in gear housing 107 upon a shaft 108. A small driving gear, which is not shown, is mounted on shaft 108 in gear housing 109 secured on the outside of housing 103. A large gear, not shown, is mounted in housing 109 and meshes with the last-named gear and is mounted upon shaft 110. A small gear, which is not shown, is mounted upon the opposite end of shaft 110 and meshes with large gear 111 which is mounted upon shaft 112. A suitable driving sprocket 113 is secured to gear 111 and extends below housings 102 and 103 and through a suitable slot cut into top plate 77 so that sprocket 113 can engage the rollers 66. The gear train thus provided has any suitable gear reduction ratio, depending upon the power and speed of the hydraulic motor 106 and it is obvious that the arrangement of these gears may be altered within the scope of our invention to provide any desired speed of rotation of sprocket 113. It should be noted that the housing for power transfer mechanism 55 should be sufficiently cut away on its forward end, as at 114, to allow the desired degree of rotation of connector 56 about pivot 81. The hydraulic hoses 59 and 60 connect to motor 106 at 115 and 116.

When pin 100 is removed, power mechanism 55 may be easily removed from the chassis so that the weight of the power transfer mechanism 55 including the chassis and coupling 56 may be such that it may be readily handled by one man.

Motor 106 is any suitable commercially available hydraulic motor of reversible type so that its direction of rotation may be reversed by merely reversing the direction of flow of hydraulic fluid. The direction of rotation of sprocket 113 is therefore easily controlled and the motion of the chassis on track 57 may be controlled in either direction by control of the hydraulic fluid supplied to motor 106.

In Figs. 10 and 11 a conventional internal combustion engine transmission is shown at 239 with a conventional power take off 240 driving a conventional pump 241. Pump 241 is provided with an outlet or pressure line 242 and a return line 243. A conventional reservoir for hydraulic fluid is connected to line 243 and is shown at 244. A by-pass from supply line 242 back to reservoir 244 is shown at 245 and is provided with a pressure relief valve 246 so that when the pressure in supply line 242 exceeds a predetermined value, valve 246 will open and by-pass the hydraulic fluid under pressure back to reservoir 244. Supply line 242 terminates in a quick connect coupling of any suitable type 247. A return line 248 is connected to reservoir 244 and terminates in any suitable quick connect coupling 249. This hydraulic system may be incorporated with the tractor of a conventional tractor-trailer type of truck.

The hydraulic system about to be described may be incorporated with the trailer of the tractor-trailer type of truck noted above. The trailer is provided with a hydraulic fluid supply line 250 which is connected at 247 to the system of the tractor and is provided with a return line 251 which is connected at 249 to the return line 248 of the tractor system. Lines 250 and 251 both terminate at 252 and 253, respectively, in quick connect couplings so that other hydraulic systems may be connected to this system when desired, as when a tandem trailer rig is being used. Line 250 is connected by line 254 with reverse control valve 255. Line 256 connects valve 255 to line 251. Line 257 connects valve 255 to a second valve 258 and to flexible hose 259 which terminates in any suitable quick connect coupling 260. Line 261 connects valve 255 with a suitable flexible hose 262 which terminates in any suitable quick connect coupling 263. Valve 258 is connected by line 264 with any suitable flexible hose 265 which terminates in a quick connect coupling 266. Line 267 connects valve 258 to valve 268 and valve 268 is connected by line 269 with flexible hose 270 which terminates in quick connect coupling 271. Valve 268 is connected by line 272 with line 261.

After the container is raised upon its casters the hydraulic system of the tractor-trailer is employed to drive the power mechanisms 55. In providing hydraulic fluid to the power mechanisms 55 for energizing the same it is desirable in some instances to connect the power mechanisms 55 in series for uniform movement and in other cases it is desirable to connect the power mechanisms 55 in parallel for independent control and slower operation. The hydraulic system of the tractor and trailer may be utilized for this purpose. Fig. 10 shows the same arranged to connect the power mechanisms 55 in parallel. The hydraulic system schematically shown in Fig. 11 discloses the arrangement of the hydraulic system of the tractor and trailer adjusted to connect the power mechanisms 55 in series.

Referring now to Fig. 10 it is there seen that fluid under pressure from pump 241 will pass through line 242 and coupling 247 into line 250 and thence through line 254 and through valve 255 into hose 259 and into one power mechanism 55. Hydraulic fluid is discharged from this power mechanism 55 through hose 270 into line 269 and thence through valve 268 and line 272 into line 261 and line 256 for return to line 251, line 248, reservoir 244 and pump 241. The hydraulic fluid under pressure passing through valve 255 also passes into line 257 and thence through valve 258 into line 265 and into the other of the power mechanisms 55. The hydraulic fluid discharged from the second power mechanism 55 passes into line 262 and into line 261 and thence through valve 255 into line 251, line 248, and reservoir 244 to the return side of pump 241. Thus it will be seen that the power mechanisms 55 are connected in parallel.

If it is desired to reverse the direction of movement of power mechanisms 55 when connected in parallel, as in Fig. 10, valve 255 is reversed without changing the position of valves 258 and 268. The hydraulic fluid under pressure in line 254 is then directed into what was the return line system as above described while what was previously the pressure line system, as above described, becomes the return line system. By reversing valve 255 fluid under pressure is admitted to line 261 and thence through flexible hose 262 to one of the power mechanisms 55. Fluid under pressure is also admitted to line 272 and thence through valve 268 into line 269 and into the other power mechanism 55. Fluid discharged from the first of the power mechanisms 55 passes through line 265 and through valve 258 into line 257 and through valve 255 into line 256 for return to the pump 241. Fluid discharged from the other of the power mechanisms 55 passes through flexible conduit 259 and through valve 255 into line 256 for return through line 251 to pump 241. Thus the hydraulic system provided by the tractor and trailer permits rapid and easy reversal of movement of the power mechanisms 55 by merely shifting the position of valve 255. It is therefore obvious that the direction of movement of the container can be easily adjusted during transfer and power mechanisms 55 can be indefinitely controlled by adjustment of valves 258 and 268.

When it is desired to connect the power mechanisms 55 so that each such power mechanism 55 obtains the full volume of hydraulic fluid from pump 241, it is necessary to connect the same in series and the adjustment of the hydraulic system of the tractor and trailer to provide this series connection is shown in Fig. 11. In this arrangement fluid under pressure passes from pump 241 through line 242 and coupling 247 into line 250 and thence into line 254 and valve 255. From valve 255 hydraulic fluid under pressure passes into hose 259 and thence into the first of the power mechanisms 55. Discharge fluid from the first power mechanism 55 passes through hose 270 and line 269 directly through valves 268 and 258 into hose 265 and thence into the second of the power mechanisms 55. The discharge from the second power mechanism 55 passes through hose 262 into line 261 and thence through valve 255 into line 256 and into line 251 for return to the pump 241, as described above.

Reversal of the direction of motion of the power mechanisms 55 is obtained by merely reversing the position of valve 255. When valve 255 is reversed fluid under pressure from line 254 enters line 261 and passes through hose 262 into the first of the power mechanisms 55. The fluid discharged from the first of the power mechanisms 55 passes outward through hose 265 and directly through valves 258 and 268 into line 269 and hose 270 and into the second of the power mechanisms 55. The discharge from the second power mechanism 55 passes through hose 259 into valve 255 and from valve 255 into line 256 for return to the pump 241 through lines 251 and 248. This hydraulic system thus provides a ready means for accurately and promptly controlling the direction of motion of the power mechanisms 55 when connected in series and thus provides a simple and direct control for the motion of the container in transfer.

It is now apparent that by the present invention we have provided a novel apparatus for transferring less than carload lot containers from one means of transportation to another or to or from one means of transportation to or from a dock or the like, which apparatus efficiently accomplishes all of the objectives described above.

It will now be apparent to those skilled in the art that changes in or modifications to the above described illustrative embodiment of our invention may now be made without departing from our inventive concept. Reference should therefore be had to the appended claims to determine the scope of this invention.

What is claimed is:

1. In a mechanism for transferring containers mounted on casters upon a substantially level vehicular supporting surface, a rack-type track recessed in and substantially flush with the supporting surface, a power unit including a motor and a driving pinion engaging and mounted for movement on said track, a connecting arm pivoted at one end of said unit, and means mounted on the end of said connecting arm for connection to the container whereby the container may be transferred to or from the supporting surface.

2. In a mechanism for transferring containers mounted on casters upon a substantially level vehicular supporting surface, a rack-type track recessed in and substantially flush with the supporting surface, a wheeled chassis mounted for movement on said track, a connecting arm mounted at one end to said chassis and detachably connected to the container at its other end, a power unit including a motor mounted on said chassis and a pinion driven by said motor and engaging said track for moving said chassis along said track whereby the container may be transferred to or from the supporting surface.

3. In a mechanism for transferring containers mounted on casters upon a substantially level vehicular supporting surface, a rack-type track recessed in and substantially flush with the supporting surface, a wheeled chassis mounted for movement on said track, an extensible and retractible connecting arm mounted at one end to said chassis and detachably connected to the container at its other end, means for controlling the length of said arm, and a power unit including a motor and a driving pinion engaging said track mounted on said chassis for moving said chassis along said track whereby the container may be transferred to or from the supporting surface.

4. In a mechanism for transferring containers mounted on casters upon a substantially level vehicular supporting surface, a rack-type track recessed in and substantially flush with the supporting surface including channels let into the sides thereof, a wheeled chassis embracing said track with said wheels mounted in said channels, means pivoted to said chassis for detachably connecting said chassis to the container, and a power unit including a motor and a driving pinion engaging said track mounted on said chassis for moving said chassis along said track whereby the container may be transferred to or from the supporting surface.

5. In a mechanism for transferring containers mounted on casters upon a substantially level vehicular supporting surface, a track recessed in and substantially flush with the supporting surface including channels let into the sides thereof and a rack along the top, a wheeled chassis embracing said track with the wheels mounted in said channels, means pivoted to said chassis for detachably connecting said chassis to the container, and a power unit mounted on said chassis including a motor and a driving pinion engaging said rack for moving said chassis along said track whereby the container may be transferred to or from the supporting surface.

6. A mechanism as described in claim 5 in which said connecting means include an extensible and retractible connecting arm, means for controlling the length of said arm and a hook mounted on the end of said arm for engaging the container.

7. A mechanism as described in claim 5 in which said connecting means includes a telescoping connecting arm, latches for locking said arm in extended or telescoped positions, and a hook mounted on the end of said arm for engaging the container.

8. In a mechanism for transferring containers mounted on casters upon a substantially level vehicular supporting surface, a rack-type track recessed in and substantially flush with the supporting surface including a pair of spaced channels in back to back relationship, and spaced rollers mounted between said channels, a wheeled chassis embracing said track with the wheels mounted in said channels, means mounted on said chassis for connecting said chassis to the container, a power unit mounted on said chassis including a motor and a driving pinion driven by said power unit engaging said rollers to move said chassis along said track whereby the container may be transferred to or from the supporting surface.

References Cited in the file of this patent

UNITED STATES PATENTS

| Number | Name | Date |
| --- | --- | --- |
| 572,377 | Schatz | Dec. 1, 1896 |
| 659,178 | Morgan | Oct. 2, 1900 |
| 900,776 | Pratt | Oct. 13, 1908 |
| 991,954 | Charbonneau | May 9, 1911 |
| 1,063,879 | Henderson | June 3, 1913 |
| 1,385,206 | Dimond | July 19, 1921 |
| 1,551,122 | Sheppard | Aug. 25, 1925 |
| 1,764,354 | Schellentrager et al. | June 17, 1930 |
| 1,857,653 | Meyercord et al. | May 10, 1932 |
| 1,861,659 | Fox | June 7, 1932 |
| 1,921,605 | Canfield | Aug. 8, 1933 |
| 2,016,662 | Aitken | Oct. 8, 1935 |
| 2,070,792 | Kent | Feb. 16, 1937 |
| 2,282,352 | Fitch | May 12, 1942 |
| 2,306,208 | Dumont | Dec. 22, 1942 |
| 2,317,984 | Fitch | May 4, 1943 |
| 2,432,156 | Hill | Dec. 9, 1947 |
| 2,685,260 | Auger | Aug. 3, 1954 |